3,251,884
BIS(HALOALKYL)DISULFIDES
Emil J. Geering, Grand Island, N.Y., assignor to Hooker Chemical Corporation, Niagara Falls, N.Y., a corporation of New York
No Drawing. Filed May 6, 1963, Ser. No. 278,388
The portion of the term of the patent subsequent to May 7, 1980, has been disclaimed
7 Claims. (Cl. 260—608)

This is a continuation-in-part of application Serial No. 800,933, now U.S. Patent No. 3,088,818.

This invention relates to novel bis(haloalkyl)disulfides and a process for the preparation of bis(haloalkyl)disulfides. More specifically, the present invention concerns the reaction of a halo-olefin with sulfur monohalide.

It is an object of this invention to provide a compound which has desirable pesticidal properties.

It is a further object of this invention to provide a compound which has desirable herbicidal properties.

A still further object of this invention is to provide a compound which will be useful as a chemical intermediate. Two compounds, for example, that may be made using bis(haloalkyl)disulfide as an intermediate are tetrachloroethyl sulfenyl chloride and bis(trichlorovinyl)disulfide, both of which are the subject of copending applications.

The product of this invention has utility as a chemical intermediate, as a herbicide, and a pesticide. Other uses will become apparent to those skilled in the art upon a reading of this disclosure. To warrant the use of a compound as an agricultural compound, in addition to being active as such, it should be economical to employ. The cost of an agricultural chemical should be commensurate with its activity. It is therefore also an object of this invention to provide an agricultural compound which is economical to manufacture.

Other objects will become apparent upon a further reading of the following disclosure.

In accordance with the instant invention, sulfur monohalide is reacted with a halo-olefin in the presence of a catalytic amount of a Lewis acid. The reaction can best be illustrated by the following general equation:

$$2RC_2X_3 + S_2Y_2 \rightarrow (RC_2X_3YS)_2$$

wherein X is a substituent selected from the group consisting of chlorine, bromine, and hydrogen, R is a substituent selected from the group consisting of alkyl, preferably 1 to 10 carbon atoms, and hydrogen and Y is a substituent selected from the group consisting of chlorine and bromine, the R substituent being alkyl when all the X substituents are chlorine, and at least one X substituent is chlorine or bromine.

The reaction can also be illustrated by the following more specific equations:

(1) 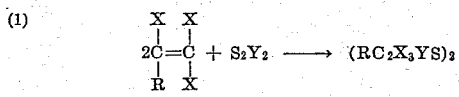

wherein the substituent R is an alkyl group, preferably of 1 to 10 carbon atoms, X is a substituent selected from the group consisting of chlorine, bromine and hydrogen, at least one X substituent being chlorine or bromine and Y is a substituent selected from the group consisting of chlorine and bromine (2) 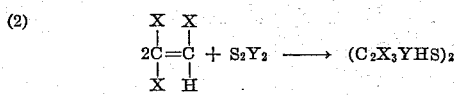

wherein the substituent X is selected from the group consisting of chlorine, bromine, and hydrogen, at least one X substituent being chlorine or bromine and at least one X substituent being bromine when the three X substituents are chlorine or bromine.

Illustrative examples of halo-olefinic starting reagents utilized in the practice of the instant invention include: vinyl chloride, vinylidene chloride, cis and trans dichloroethylene, 1,1,2-trichloropropylene and 1,1-dichlorodecene-1. It should be appreciated that other halo-olefins can be utilized without departing from the scope of the present invention.

Illustrative examples of the Lewis acid catalysts include aluminum chloride, ferric chloride, zinc chloride, and the like. It is, of course, appreciated that other Lewis acid catalysts can be employed without departing from the teaching of the invention.

It was surprising and unexpected that the compounds of this invention could be produced by the aforementioned reaction. From the prior art one could expect that the reaction product of an aluminum chloride catalyzed addition of sulfur monochloride to an halo-olefin would be a monosulfide. It has been found, however, that a product which is essentially pure disulfide can be prepared from these reactants, provided that the teachings of this invention are followed. The preparation of the substantially pure disulfides of this invention by the interaction of a halo-olefin and sulfur monochloride was unknown in the prior art.

The novel compositions prepared by the process of the present invention are represented by the formula:

$$(C_2X_{5-n}H_nS)_2$$

wherein $n$ is an integer of 1 to 3 inclusive, X is a substituent selected from the group consisting of chlorine and bromine, at least one X substituent being bromine when the integer $n$ is 1.

In a preferred embodiment, one mole of sulfur monochloride is reacted with two or more moles of the halo-olefin in the presence of a Lewis acid catalyst such as $AlCl_3$ and at a temperature from between about $-50$ degrees centigrade to about 100 degrees centigrade with a preferred temperature of $-25$ degrees centigrade to about 40 degrees centigrade.

In carrying out the method of this invention the order of addition can be important. In order to obtain bis(haloalkyl)disulfide as the sole product of the reaction, it is important to add the sulfur monochloride to the mixture of halo-olefin and aluminum chloride. It is preferred to add the sulfur monochloride slowly to a cooled mixture of halo-olefin and aluminum chloride. Upon completion of the reaction the usual procedures of removing catalyst from Friedel-Crafts reaction mixtures by hydrolysis may be employed. In the preferred method, however, the aluminum chloride or other Friedel-Crafts catalyst is removed by filtration. The filtrate is then washed with water and may be washed with an alcohol to remove traces of aluminum salts and complexes. Any mono- or polyfunctional alcohol that has the desired solubility and solubilizing characteristics may be used. However, it is preferable to employ a relatively volatile alcohol such as methanol or ethanol. The product is dried by any of the appropriate methods that are known to the art, and the excess halo-olefin, if present, and any dissolved alcohol are removed by reduced pressure stripping.

The process of the present invention is conveniently carried out at atmospheric pressure although sub and super atmospheric pressures can be employed without departing from the scope of the invention. For example, pressures in the range of 300 millimeters of mercury to 900 millimeters of mercury can be utilized in the practice of the invention.

A solvent is not generally necessary to accomplish the reaction of the invention. However, one can be used to moderate or facilitate the reaction if desired. Solvents such as nitroalkanes and the like may be employed. Other solvents of high enough boiling point (so as not to be boiled off) and inert with respect to the reactants may also be used, e.g., toluene.

In order that those skilled in the art may better understand the present invention and the manner in which it may be practiced, the following specific examples are given. All parts are by weight and all temperatures are in degrees centigrade unless otherwise indicated.

*Example 1*

A solution of sulfur monochloride and methylene chloride saturated with slight excess aluminum chloride was prepared by admixing and stirring a slurry of powdered anhydrous aluminum chloride, 67.5 grams (0.5 mole) of sulfur monochloride and 300 milliliters of methylene chloride. The resulting solution was decanted from the undissolved aluminum chloride and then added over a 45 minute interval to a stirred refluxing solution of 107 grams (1.1 moles) of vinylidene chloride and 200 milliliters of methylene chloride. After heating the reaction mixture at reflux for 45 minutes, it was washed with water, dried, and was then concentrated to a red oil. This product was distilled in a Hickman still at seven microns of mercury pressure (bath temperature up to 160 degrees centigrade). A portion of the distillate was recrystallized from pentane to give a white solid of melting point of 52 to 53 degrees centigrade.

*Analysis.*—Calculated for $C_4Cl_6H_4S_2$: Cl, 64.7 percent; S, 19.5 percent. Found: Cl, 64.4 percent; S, 18.9 percent.

*Example 2*

Powdered anhydrous aluminum chloride, 6.5 grams, was added to 427 grams (4.4 moles) of cis-dichloroethylene cooled to zero degrees centigrade. To this slurry, stirred and cooled to 0 to 5 degrees centigrade was added 270 grams (2.0 moles) of sulfur monochloride during a one-half hour period. The reaction mixture, a black slurry of complexed aluminum chloride, was stirred with 50 grams of fuller's earth while the mixture was warmed to room temperature. It was then filtered through a coarse frittered glass filter. Methanol, 25 milliliters was added to the filtrate to aid in the hydrolysis of dissolved aluminum chloride complex. The filtrate was then washed successively with water, five percent aqueous sodium carbonate, water and finally it was dried over anhydrous magnesium sulfate. The product was an orange colored oil.

*Analysis.*—Calculated for $C_4Cl_6H_4S_2$: Cl, 64.7 percent; S, 19.5 percent. Found: Cl, 64.4 percent; S, 18.9 percent.

*Example 3*

To a stirred solution of 54.2 grams (0.205 mole) of tribromoethylene and 1.3 grams of powdered aluminum chloride cooled to zero degrees centigrade was added 13.5 grams (0.1 mole) of sulfur monochloride during a five-minute period. The mixture was held at 5 to 10 degrees centigrade for 50 minutes, and then poured into a mixture of hydrochloric acid and ice. The crude product was taken up in carbon tetrachloride. After washing this solution with water, it was dried, treated with decolorizing charcoal and fuller's earth, and then was stripped under reduced pressure to a red oil.

*Analysis.*—Calculated for $C_4H_2Br_6Cl_2S_2$: Theoretical: Cl, 10.6 percent. Found: Cl, 10.9 percent.

*Example 4*

Chlorine was passed into a stirred solution of 329 grams (1.0 mole) of the product of Example 2 above, said solution being at a temperature of 25 to 30 degrees centigrade, and 0.3 gram of iodine over a one and one-third hour period, thereby converting the disulfide to trichloroethanesulfenyl chloride. Then 8 grams of chlorosulfonic acid were added as a catalyst for substitutive chlorination. The chlorination was continued at 25 to 30 degrees centigrade for two and one-half hours, during which time, two moles of hydrogen chloride were collected in a water trap.

Gas chromatographic analysis of the 462 grams of crude product revealed the following:

| | Percent |
|---|---|
| Low boiler | 10.00 |
| Tetrachloroethanesulfenyl chloride | 82.00 |
| Pentachloroethanesulfenyl chloride | 7.70 |
| High boiler | 0.29 |

In a similar manner, using the same molar proportions, the corresponding bromo compound is prepared by replacing the sulfur monochloride reactant in Example 1 with sulfur monobromide.

The products obtained are useful as insecticides and pesticides against a variety of harmful species, including pea aphids, armyworm and Mexican bean beetle.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

I claim:

1. A compound of the formula:

$$(C_2X_{5-n}R_nS)_2$$

wherein X is selected from the group consisting of chlorine, bromine, and hydrogen; at least two of said X substituents being selected from the group consisting of chlorine and bromine; R is selected from the group consisting of hydrogen and alkyl of one to ten carbon atoms; n is from 1 to 3; said R substituent being alkyl and at least one of said X substituents being bromine when n is 1; and, at least one of said X substituents being bromine when n is 2 and R is hydrogen.

2. The compound of claim 1 wherein X is chlorine.
3. The compound of claim 1 wherein X is bromine.
4. The compound of claim 1 wherein the integer n is 2.
5. A bis(bromo-chloroalkyl)disulfide of the formula:

$$C_4H_2Br_6Cl_2S_2$$

6. A process for preparing bis(haloalkyl)disulfides which comprises reacting a compound of the formula:

$$RC_2X_3$$

with a compound of the formula $$S_2Y_2$$

in the presence of $AlCl_3$ catalyst, wherein R is an alkyl radical of from 1 to about 10 carbon atoms, X is a substituent selected from the group consisting of chlorine, bromine and hydrogen and Y is a substituent selected from the group consisting of chlorine and bromine, and at least one X substituent is selected from the group consisting of chlorine and bromine.

7. A process for the preparation of bis(haloalkyl)disulfides which comprises adding sulfur monochloride to a compound of the formula:

$$HC_2Br_3$$

in the presence of $AlCl_3$ hydrolyzing the resultant mixture and recovering the bis(chloroalkyl)disulfide formed.

References Cited by the Examiner

UNITED STATES PATENTS 3,088,818  5/1963  Gering _____ 260—609

FOREIGN PATENTS 1,121,607  1/1962  Germany.

CHARLES B. PARKER, *Primary Examiner.*

DANIEL D. HORWITZ, *Examiner.*